United States Patent

Carlson et al.

[15] 3,699,528

[45] Oct. 17, 1972

[54] ADDRESS MANIPULATION CIRCUITRY FOR A DIGITAL COMPUTER

[72] Inventors: Carl B. Carlson, Santa Barbara; William M. McKeeman, Santa Cruz; William C. Price, Pasadena, all of Calif.

[73] Assignee: Burroughs Corporation, Detroit, Mich.

[22] Filed: Feb. 16, 1970

[21] Appl. No.: 11,646

Related U.S. Application Data

[63] Continuation-in-part of Ser. No. 670,304, Sept. 25, 1967, abandoned.

[52] U.S. Cl. ........................................ 340/172.5

[51] Int. Cl. ........................................ G06f 9/20

[58] Field of Search ........................................ 340/172.5

[56] References Cited

UNITED STATES PATENTS

| | | | |
|---|---|---|---|
| 3,222,649 | 12/1965 | King | 340/172.5 |
| 3,412,382 | 11/1968 | Cooleur | 340/172.5 |
| 3,482,214 | 12/1969 | Sichel | 340/172.5 |
| 3,510,847 | 5/1970 | Carlson | 340/172.5 |

*Primary Examiner*—Paul J. Henon
*Assistant Examiner*—Ronald F. Chapuran
*Attorney*—Christie, Parker & Hale

[57] ABSTRACT

The overlay of information from the computer memory to a peripheral memory and its return to the computer memory are facilitated by a unique format for original and copy descriptors. The copy descriptors have a first field that designates either a base address or the location of its original, and a second field that designates an index. The original descriptors have a field that designates the base address. The copy descriptors are automatically generated from their originals. When a copy descriptor is retrieved, the first and second fields are added to form the absolute address if the first field is the base address. If the first field is an original descriptor location, the base address of the original descriptor and the index of the copy descriptor are added to form the absolute address. Upon overlay, the copy descriptors to be updated are sensed by comparing their base value with the base value of the array to be overlaid. They are updated by substituting the original descriptor location for the base address and the original descriptors are updated by substituting the peripheral memory address for the base address. Upon return of the overlaid information to the computer memory, only the original descriptor must be updated.

39 Claims, 6 Drawing Figures

PATENTED OCT 17 1972

3,699,528

SHEET 2 OF 4

ADDRESS MANIPULATION CIRCUITRY FOR A DIGITAL COMPUTER

CROSS-REFERENCE TO RELATED APPLICATIONS

This is a continuation-in-part of a copending application, Ser. No. 670,304, filed on Sept. 25, 1967 now abandoned.

BACKGROUND OF THE INVENTION

This invention relates to digital computers, and more particularly to techniques for developing addresses to access the cells of a compter memory.

A peripheral or backup memory unit, such as a disc file or magnetic tape unit, is sometimes provided for use with a digital computer, particularly large computers in which a plurality of object programs are executed concurrently under the supervision of a master control program. The transfer of information stored in the computer memory to a peripheral memory in order to make room in the computer memory for other information is an operation sometimes called "overlay." An overlay operation is initiated whenever an insufficient unoccupied area remains in the computer memory in the course of the execution of a program. Other information in the computer memory, which is not being utilized at that time, is overlaid to the peripheral memory to make room in the computer memory. The overlaid information is subsequently returned to the computer memory at such time as it is needed in the execution of a program. By employing a peripheral memory with a digital computer in this fashion, less storage capacity is required in the computer memory. This may make an overall cost reduction possible because computer memories are relatively expensive.

Descriptors are commonly employed in digital computer operations to reference memory cells in the computer memory where data or program information is stored. In some computers, descriptors are also used to reference entire arrays or blocks of memory cells. In the course of generating the descriptors the first time information in the computer memory is referenced, an original descriptor is produced, and thereafter copies of the original descriptor are produced to reference the same information. Sometimes the original and copy descriptors have a common format that includes first, second, and third fields. In the original descriptors, the first field designates a base address value, i.e., the address of the cell at the lower boundary of the referenced array, the second field designates the length value of the referenced array, i.e., the number of cells in the array, and the third field is not utilized. In the copy descriptors referencing a cell in the computer memory, the first field designates the address value of the referenced cell, the second field is not utilized, and the third field designates the location of the corresponding original descriptor. Since the third field is not utilized in the original descriptors and the second field is not utilized in the copy descriptors referencing a cell, the addressing potential of the descriptors is not fully exploited.

When the information in an array is overlaid to the peripheral memory unit, the related descriptors must be modified or updated to reflect the absence of the referenced information from the computer memory. The cell copy descriptors to be updated are determined by ascertaining if the address of each such descriptor lies between the base address of the array and the base address of the array plus the array length. All copy descriptors with an address between these limits are updated by inserting the location of the original descriptor of the array into the third field. In addition, it is necessary to compute the index value of the address field of each cell copy descriptor, i.e., the number of cells from the base of the array to the cell in question, because the overlaid information is in general stored in a new array upon its return to the computer memory. At that time, the same copy descriptors are again updated by adding the index to the base address of the new array to form the cell address. The copy descriptors to be modified on the return of the overlaid information to the computer memory are ascertained by comparing the third field of each descriptor with the memory location of the original descriptor referencing the returned information. Thus, a great deal of address manipulation of the copy descriptors is necessitated by overlay and return of information to the computer memory.

SUMMARY OF THE INVENTION

The invention is based upon the concept of fragmenting the address of the copy descriptors referencing a cell in a computer memory into two fields, namely a base address field denoting the cell at a boundary of the array (preferably the lower boundary) and an index field denoting the referenced cell within the array relative to the base address. The format of the copy descriptors includes a first field designating either a base address value or the memory location of an original descriptor, a second field designating an index value, and a third field designating the nature of the first field, namely a base address value or an original descriptor location. Thus, base address values and original descriptor locations share the first field depending upon the overlay history of the referenced information. The format of the original descriptors includes a first field designating either a base address value in the computer memory or an address value in a peripheral memory, a second field designating an array length value, and a third field designating the nature of the first field, namely a computer memory base address or a peripheral memory address.

Since the base address value of an array present in the computer memory appears in the first field of the copy descriptors, the copy descriptors to be updated on overlay can be determined by a simple comparison with the base address value of the original descriptor referencing the information to be overlaid. To update the copy descriptors on overlay, the original descriptor location is substituted for the base address of each copy descriptor having a first field identical to the first field of the original descriptor and the designation of the third field of these copy descriptors is changed. No computation of an index value is required on overlay because the index value is permanently maintained in the second field of the copy descriptors. The original descriptor referencing the information to be overlaid is updated by substituting the peripheral memory address for the computer memory base address and changing the designation of the third field. On the return of the overlaid information to the computer memory, the copy descriptors are not updated. Therefore, no search for copy descriptors takes place. The return of the overlaid information is reflected solely by updating the original descriptor. Specifically, the new base address value of the returning information is substituted in the first field of the original descriptor for the peripheral memory address and the designation of the third field is again changed.

The significant reduction in address manipulation on overlay and the return of information from the peripheral memory is made possible by circuitry that operates upon the descriptors responsive to the value of the third field of the affected descriptors. Upon the occurrence of a computer instruction to access the computer memory, the third field of the appropriate descriptor is inspected.

Assuming first the inspected descriptor is a copy descriptor, the first and second fields of the descriptor are added to produce an absolute address if the third field designates a base address value in the first field. The absolute address is used to access the computer memory. If, on the other hand, the third field designates an original descriptor location in the first field, this original descriptor is retrieved and its third field inspected. If the third field of the original descriptor designates a base address value in the first field, then the first field of the original descriptor and the second field of the copy descriptor are added to produce an absolute address. If, on the other hand, the third field of the original descriptor designates a peripheral memory address in the first field, the execution of the program is interrupted, the information stored at the peripheral memory address is returned to the computer memory, and the original descriptor referencing this information is updated. Thereafter, the previously described operation for producing the absolute address takes place.

Assuming next the inspected descriptor is an orginal descriptor instead of a copy descriptor and the third field designates a peripheral memory address in the first field, the information stored at the peripheral memory address is returned to the computer memory and the original descriptor is updated.

A feature of the invention is the automatic generation of a copy of a descriptor, which may be an original or copy descriptor. The copy is generated responsive to the third field of the descriptor being copied and a fourth field thereof that designates its nature, namely, a copy descriptor or an original descriptor. Specifically, if the third and fourth fields designate the descriptor being copied is an original descriptor referencing information absent from the computer memory, a copy is generated that has a first field designating the memory location of the original descriptor, a second field designating an index or length value, a third field designating that the first field is an original descriptor location, and a fourth field designating that the descriptor is a copy. If the third and fourth fields designate the descriptor being copied is an original descriptor referencing information present in the computer memory, a copy is generated that is identical to the original descriptor except for the fourth field. The fourth field of course designates a copy descriptor instead of an original descriptor. If the fourth field designates the descriptor to be copied is a copy descriptor, whether present or absent, a copy is generated that is completely identical to the descriptor from which it derives.

BRIEF DESCRIPTION OF THE DRAWINGS

The features of a specific embodiment of the invention are illustrated in the drawings, in which.

DESCRIPTION OF A SPECIFIC EMBODIMENT

Figure 3:
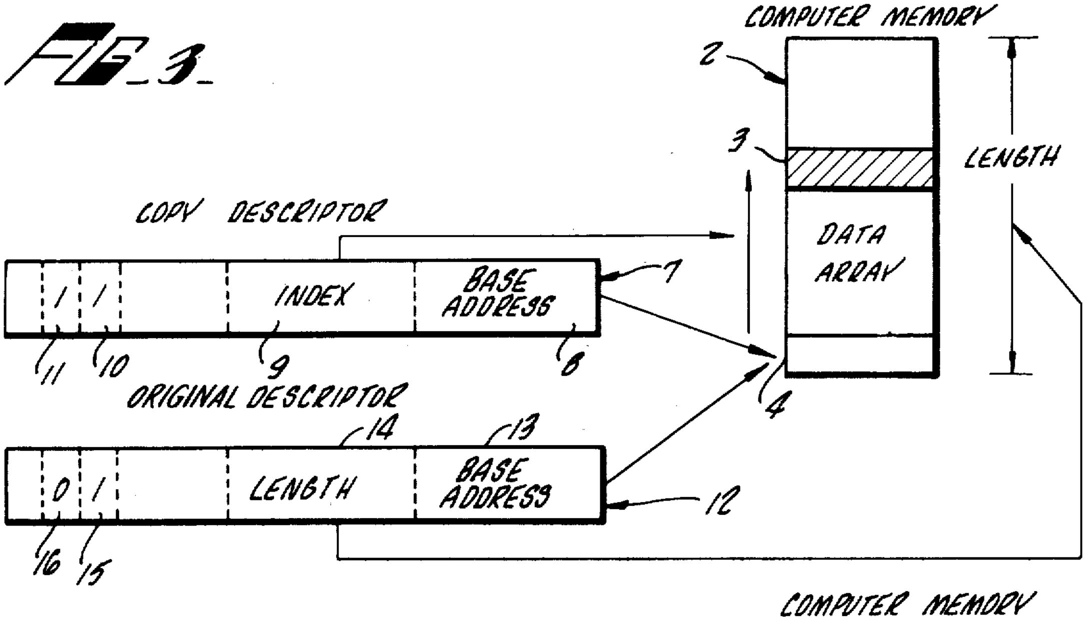
FIGS. 3, 4 and 5 are schematic diagrams illustrating descriptor formats and the addressing techniques employed in connection with the circuitry of FIGS. 1 and 2.
Figure 4:
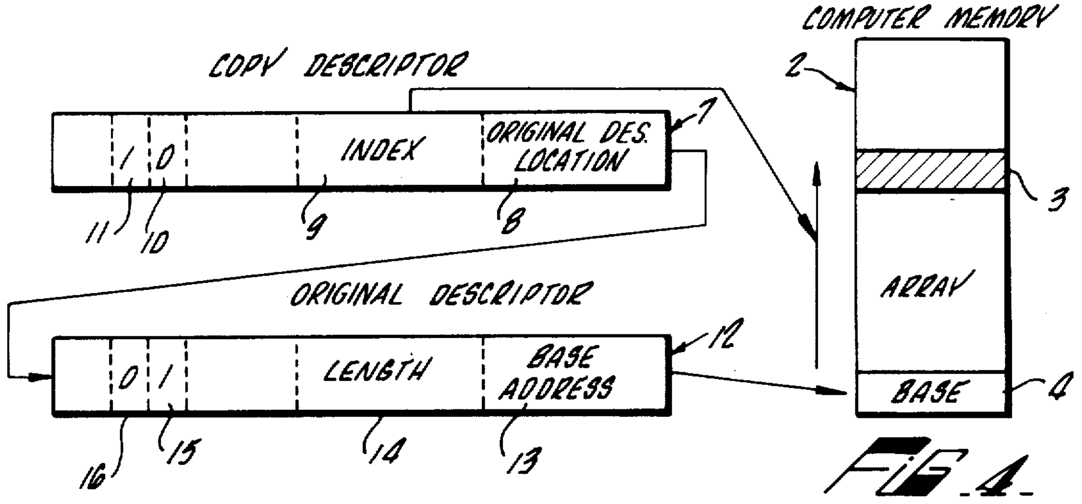
Figure 5:
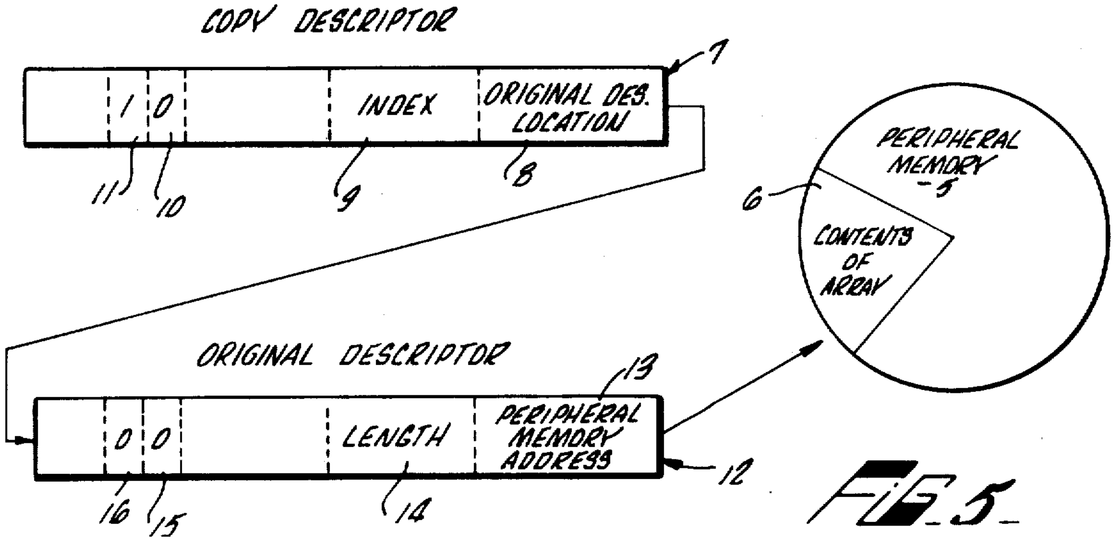

Reference is now made to FIGS. 3, 4 and 5 in which descriptors of the type with which the invention is concerned, an array in a computer memory, and a peripheral memory are depicted. For the purposes of visualization, the array is represented in FIGS. 3 and 4 as a rectangular block 2 having memory cells such as 3 and 4 that extend across the width of the array and are located one on top of the other in the array to represent that the cells within the array have successive memory addresses. The peripheral memory unit is represented in FIG. 5 as a circle 5 having a pie-shaped portion 6 where information from an array in the computer memory is stored on overlay.

In FIG. 3, a typical copy descriptor 7 is shown which references cell 3 in the computer memory. Copy descriptor 7 includes a field 8 designating a base address value, a field 9 designating an index value, a field 10 designating the nature of field 8, and a field 11 designating the type of descriptor. As illustrated in FIG. 3, the base address value of copy descriptor 7 is the memory address of cell 4, i.e., the cell at the lower boundary of array 2. Further, the index value of copy descriptor 7 is the number of cells from cell 3 to cell 4. Accordingly, the absolute address of cell 3 in the computer memory is the sum of the base address value and the index value. Field 11 has a single descriptor identification digit place having a value of 1 to designate that descriptor 7 is a copy descriptor. Field 10 has a single field identification digit place having a value of 1 to designate that field 8 is a base address. In FIG. 3, a typical original descriptor 12 is also shown which references the entire array 2. Original descriptor 12 includes a field 13 designating a base address value, a field 14 designating a length value, a field 15 designating the nature of field 13, and a field 16 designating the type of descriptor. Fields 13, 14, 15 and 16 occupy the same digit places in original descriptor 12 as fields 8 and 9, 10 and 11, respectively, occupy in copy descriptor 7. As illustrated in FIG. 3, the base address value of field 13 is the memory address of cell 4, i.e., the cell at the lower boundary of array 2. The length value of field 14 is the number of cells in array 2. Therefore, fields 13 and 14 define the bounds of the entire array. In this case, the descriptor identification digit place of field 16 has a 0 value to designate that descriptor 12 is an original descriptor and the field identification digit place of field 15 has a 1 value to designate that field 13 is a base address in the computer memory. There could also be copies of a descriptor which references an entire array. In such case, field 9 would designate the length value and another field, not shown, would designate that field 9 is a length value.

In FIG. 4, copy descriptor 7 and original descriptor 12 are shown after overlaid information which they reference is returned from peripheral memory 5 to the computer memory. In this case, field 8 of copy descriptor 7 designates the location of the original descriptor for array 2 and the field identification digit place of field 10 has a 0 value to designate that field 8 is an original descriptor location. As illustrated in FIG. 4, original descriptor 12, which is identical to the case of FIG. 3, is retrieved with the aid of the original descriptor location of field 8 of copy descriptor 7. Since field 13 of original descriptor 12 designates the base address value of array 2, the absolute address of cell 3 in the computer memory is in this case the sum of fields 9 and 13.

In FIG. 5, copy descriptor 7 and original descriptor 12 are shown while the information they reference is overlaid in peripheral memory 5. Copy descriptor 7 is identical to the case illustrated in FIG. 4. Original descriptor 12, however, is different. Field 13 of original descriptor 12 designates the address in peripheral memory 5 of the overlaid information and the field identification digit place of field 15 has a 0 value to designate that field 13 is a peripheral memory address.

Before describing the operation of the address manipulation circuitry of the invention in detail, consideration is given to a copending application of Carl B. Carlson, Benjamin A. Dent, and William M. McKeeman, entitled "Address Manipulation Circuitry for a Digital Computer," Ser. No. 670,031, filed on Sept. 25, 1967, and assigned to the assignee of the present application. This application matured into U.S. Pat. No. 3,510,847, on May 5, 1970. The referenced application discloses and claims circuitry that functions with descriptors referencing cells in a computer memory and descriptors referencing entire arrays in a computer memory. These descriptors have a format that includes a first field designating a base address value, a second field designating an index value in a cell descriptor and a length value in an array descriptor, and a third field designating the nature of the second field. On each occurrence of an instruction requiring access to the computer memory, the third field of the appropriate descriptor is inspected to determine the nature of its second field. If the third field designates an index value in the second field, the first and second fields of the descriptor are added to produce an absolute address that is used to gain access to the referenced memory cell. If the third field designates a length value in the second field, the descriptor is indexed, i.e., the appropriate index value for the descriptor is retrieved and substituted for the length value in the second field. The first and second fields are then added to produce an absolute address. If the copy descriptors discussed in connection with FIGS. 3, 4 and 5 reference an entire array, they can be indexed in the manner described in application, Ser. No. 670,031.

Figure 1:
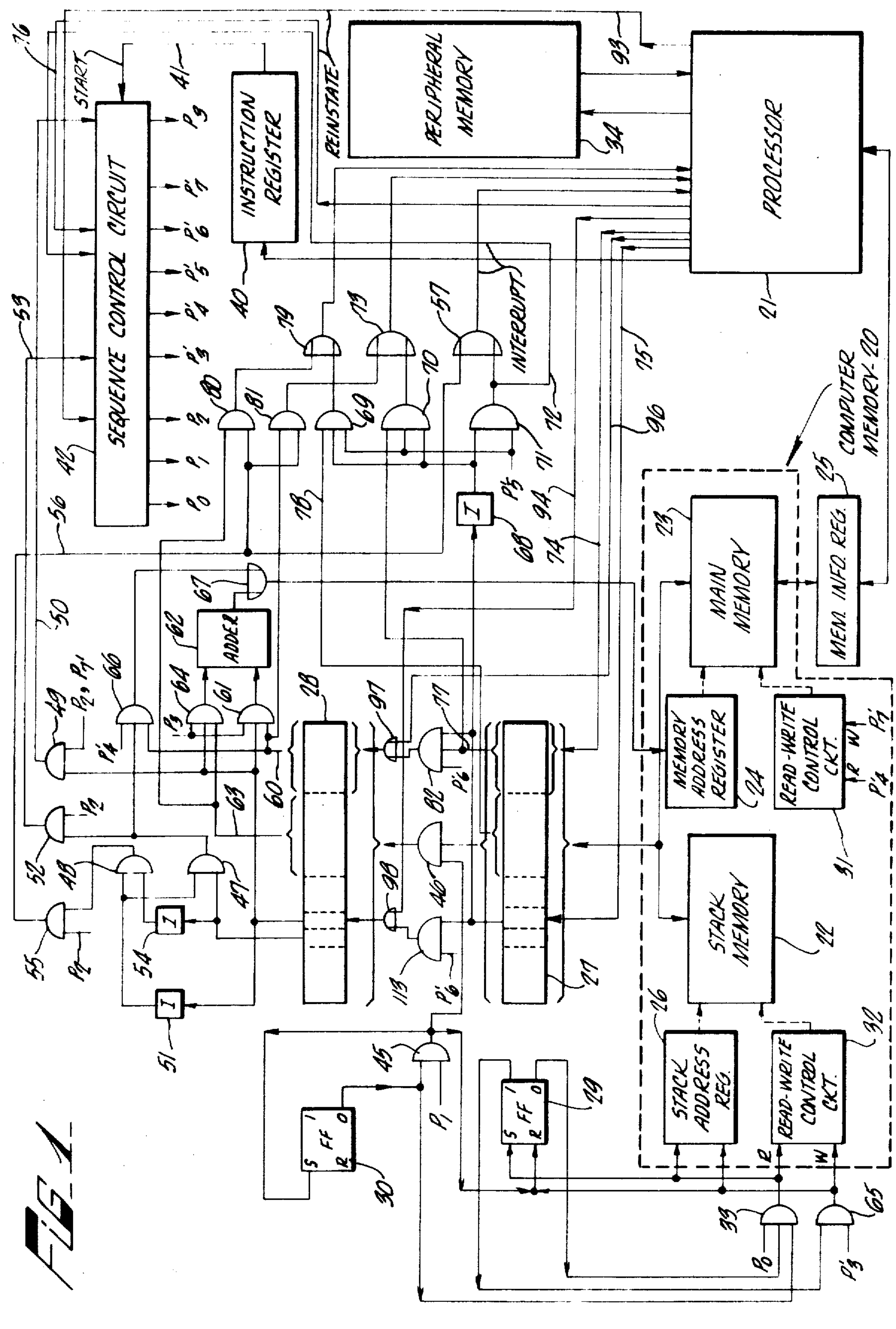
FIG. 1 is a block schematic diagram of address manipulation circuitry incorporating the principles of the invention.
Figure 2:
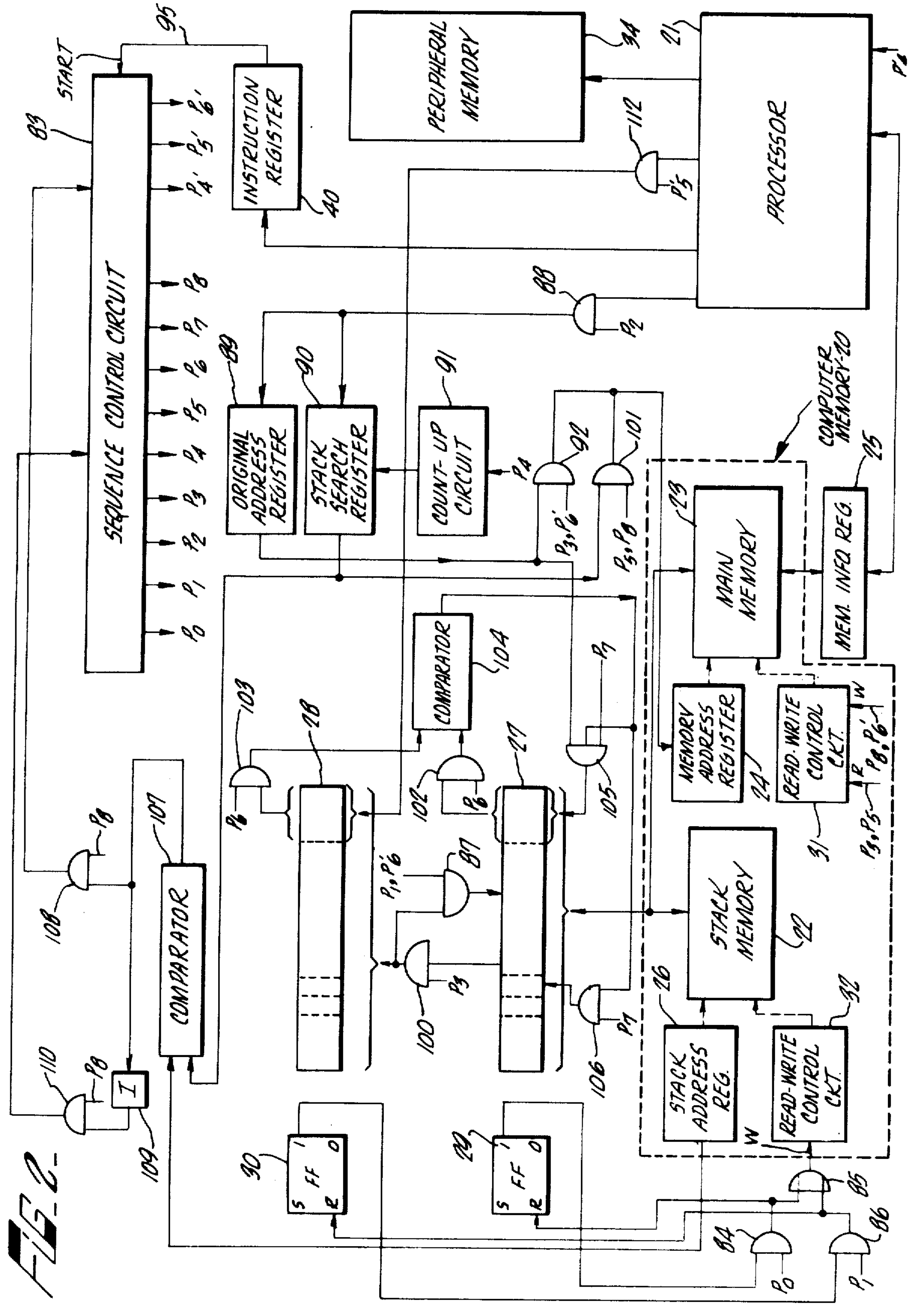
FIG. 2 is a block schematic diagram of circuitry for updating descriptors on overlay according to the invention.

It is to be understood that information could be transferred in either series or parallel to and from the registers disclosed in FIGS. 1 and 2. A single lead and a single AND gate are used in FIGS. 1 and 2 to represent each circuit connection through which information is transferred to and from these registers. However, if the transfer were in parallel, then one lead and one AND gate for each digit place would in fact be employed. If the transfer were in series, then each digit of the information would be transmitted in turn by the single lead and gated through the single AND gate.

In FIG. 1, circuitry is shown for addressing a computer memory responsive to the descriptors depicted in FIGS. 3, 4 and 5. This apparatus operates in conjunction with a digital computer having a computer memory 20 and a processor 21. A portion of computer memory 20 is assigned to serve as a temporary storage area for descriptors, operands, and other items of information utilized in the course of the operation of the computer. This temporary storage area is called a stack because items are stored and read out on a last-in first-out basis. In other words, items are always removed from the top of the stack. Although the stack is physically part of computer memory 20, it is represented separately in FIG. 1 as a stack memory 22, while the remainder of computer memory 20 is represented as a main memory 23. The descriptors in stack memory 22 reference cells and arrays in main memory 23. As used herein, the term "cell" means one or more digit places in the memory forming a character, word, etc., and the term "array" means a group of cells having consecutive addresses in the memory. In the course of the generation of the descriptors, the first time information in an array in computer memory 20 is referenced, an original descriptor is generated, and each time thereafter a copy descriptor is generated. Thus, all the copy descriptors for a particular original descriptor lie above that original descriptor in the stack. The circuitry for creating copy descriptors is considered in detail below in connection with FIG. 6. To access a cell in main memory 23, a memory address designating the location of the cell in main memory 23 is applied to a memory address register 24. Then an exchange of information between the designated cell location in main memory 23 and processor 21 takes place through a memory information register 25 under the control of a read-write control circuit 31. A stack address register 26 indicates the address of the top of the stack of memory 22. Each time an item is read or removed from the stack, the address value in register 26 is decreased by one and each time an item is written or placed in the stack, the address value in register 26 is increased by one. Registers 27 and 28 are employed in conjunction with stack memory 22. The state of flip-flops 29 and 30 indicate whether registers 27 and 28, respectively, are occupied, i.e., contain information to be preserved. If flip-flop 29 or 30 is set so its 1 output is energized, then the respective register is occupied. If flip-flop 29 or 30 is reset so its 0 output is energized, then the respective register is not occupied.

For the purpose of describing the invention, it is first assumed that any copy descriptor in register 28 has an index value in field 9 (FIG. 3). The situation in which a copy descriptor may have a length value in field 9 is discussed below after the description of the operation of the circuitry of FIG. 1.

In the course of the operation of the computer, instructions are transferred from processor 21 to an instruction register 40. When register 40 receives an instruction requiring access to main memory 23, for example a read or write operation, a start signal is generated that is coupled by a lead 41 to a sequence control circuit 42. Sequence control 42, which is conventional sequencing circuitry, has a plurality of leads that are energized in succession at intervals of time which may be determined by the master clock source of the computer.

On the appearance of the start signal on lead 41, lead $P_0$ is energized. Lead $P_0$ and the 0 outputs of flip-flops 29 and 30 are connected to the inputs of an AND gate 33 whose output is coupled to the read input of a read-write control circuit 32 for stack memory 22. If registers 27 and 28 are both unoccupied as lead $P_0$ is energized, the output of AND gate 33 becomes energized to actuate read-write control circuit 32. As a result, the descriptor at the top of stack memory 22 is transferred to register 27 and the value stored in register 26 is decreased by one. At the same time, flip-flop 29 is set to indicate that register 27 is occupied.

Next, lead $P_1$ is energized. Lead $P_1$ and the 0 output of flip-flop 30 are connected to the inputs of an AND gate 45. If register 28 is unoccupied as lead $P_1$ is energized, the entire descriptor in register 27 is coupled through an AND gate 46 to register 28, flip-flop 30 is set to indicate register 28 is occupied, and flip-flop 29 is reset to indicate register 27 is not occupied.

Next, lead $P_2$ is energized. The descriptor identification digit place and the field identification digit place of the descriptor in register 28 are inspected by AND gates 47 and 48, respectively. The field identification digit place is directly connected to the input of an AND gate 49. If the value in this digit place is 1 as lead $P_2$ is energized, the output of AND gate 49, which is coupled to sequence control circuit 42 by a lead 50, is energized. In this case, the operation is initiated in which lead $P_3$ is energized. The descriptor identification digit place is directly connected to one input of AND gate 47 and the field identification digit place is connected through an inverter 51 to the other input of AND gate 47. If the values in the descriptor and field identification digit places are 1 and 0, respectively, as lead $P_2$ is energized, the output of an AND gate 52, which is connected by a lead 53 to sequence control circuit 42, is energized. In this case, the sequence of operations is initiated in which leads $P'_3$, $P'_4$, $P'_5$, $P'_6$, and $P'_7$ are energized in succession. The descriptor and field identification digit places are connected to the inputs of AND gate 48 through an inverter 54 and inverter 51, respectively. If the values in both these digit places are 0 as lead $P_2$ is energized, the output of an AND gate 55, which is connected by a lead 56 and an OR gate 57 to processor 21, is energized. In this case, the execution of the computer program is interrupted and the information referenced by the descriptor in register 28 is returned from peripheral memory 34 to computer memory 20.

It is first assumed that the values in both the descriptor and field identification digit places are 1, in which case lead $P_3$ is energized immediately after lead $P_2$. As discussed in connection with FIG. 3, a copy descriptor having a base address value in field 8 is stored in register 28 for this combination of identification digit values. Therefore, when lead $P_3$ is energized the base address value of the copy descriptor in register 28 is coupled by a lead 60 through an AND gate 61 to one input of an adder 62 and the index value of the copy descriptor in register 28 is coupled by a lead 63 through an AND gate 64 to the other input of adder 62. Adder 62 produces an absolute address value that identifies the location in memory to be accessed. This absolute address is coupled through an OR gate 67 to memory address register 24 with the result that information is exchanged between processor 21 and the addressed cell of main memory 23.

Assuming next that the values in the descriptor and field identification digit places in register 28 are originally 1 and 0, respectively, lead $P'_3$ is energized immediately after lead $P_2$. As discussed in connection with FIGS. 4 and 5, this combination of identification digit values occurs in a copy descriptor having its original descriptor location in field 8. Lead $P'_3$ and the 1 output of flip-flop 29 are connected to the inputs of an AND gate 65, whose output is connected to the write input of read-write control circuit 32. If register 27 is occupied as lead $P'_3$ is energized, the item in register 27 is transferred to the top of stack memory 22. At the same time, flip-flop 29 is reset to indicate it is not occupied and the value stored in register 26 is increased by one.

Next, lead $P'_4$ is energized. Lead $P'_4$, the output of AND gate 47, and lead 60 are all connected to the inputs of an AND gate 66. The output of AND gate 66 is coupled through OR gate 67 to memory address register 24. Thus, as lead $P'_4$ is energized, the original descriptor location of the copy descriptor stored in register 28 is coupled through AND gate 66 to memory address register 24 and read-write control circuit 31 is actuated to transfer the contents of the addressed location in computer memory 20 to register 27. Actually, the addressed location is in the stack portion of computer memory 20. Since this is physically part of computer memory 20, however, it can be, and is in this case, accessed by applying the appropriate address value to memory address register 24.

Next, lead $P'_5$ is energized. The field identification digit place of the original descriptor in register 27 is coupled through an inverter 68 to one input of each of AND gates 69, 70 and 71. If the value in this digit place is 1, $P'_6$ is energized directly without any intervening operations. If the value in this digit place is 0, indicating that the referenced information is overlaid in peripheral memory 34 and that the peripheral memory address is in field 13 (FIG. 5) of the original descriptor, an interrupt signal is generated at the output of AND gate 71 as lead $P'_5$ is energized. This interrupt signal is coupled by a lead 72 to sequence control circuit 42 to inhibit the energization of lead $P'_6$. The peripheral memory address of the overlaid information is coupled from register 27 by a lead 77 through AND gate 70 and an OR gate 73 to processor 21 and the length value of the overlaid information is coupled from register 27 by a lead 78 through AND gate 69 and an OR gate 79 to processor 21. The length value and the peripheral memory address completely define the location of the overlaid information in peripheral memory 34. Processor 21 transfers the overlaid information to an unoccupied array in main memory 23 by well-known techniques that are not the subject of the present invention. After the overlaid information is returned to computer memory 20, all the descriptors in the stack referencing this information are completely updated by the single step of modifying only the original descriptor because all the copy descriptors have the original descriptor location in field 8. The base address of the array to which the overlaid information is returned is substituted for the peripheral memory address in field 13 of the original descriptor in register 27 and the value in the field identification digit place is changed to 1. No further modification of any descriptors referencing the returned information is necessary. Leads 75 and 74 couple processor 21 to the field identification digit place and field 13, respectively, of the original descriptor in register 27. After the overlaid information is returned to computer memory 20 and the appropriate original descriptor is updated, processor 21 generates a reinstate signal that is coupled by a lead 76 to sequence control circuit 42. Responsive to the reinstate signal, lead $P'_6$ is energized.

In any case, i.e., whether the value in the field identification digit place of register 27 is 1 or 0 as lead $P'_5$ is energized, the value in this digit place is 1 as lead $P'_6$ is energized. The field identification digit place of the original descriptor in register 27 is coupled through an AND gate 113 and an OR gate 98 to the field identification digit place of the copy descriptor in register 28 and field 13 of the original descriptor in register 27 is coupled through an AND gate 82 and an OR gate 97 to field 8 of the copy descriptor in register 28. Therefore, upon the energization of lead $P'_6$, the value in the field identification digit place of register 28 is changed to 1 and the base address value of the original descriptor replaces the original descriptor location of the copy descriptor in register 28.

When lead $P'_7$ is energized, the values in the descriptor and field identification digit places are both 1. Thus, lead 50 becomes energized to initiate the operation in which lead $P_3$ is energized.

When lead $P_3$ is energized, the base address value and the index value in register 28 are coupled through AND gates 61 and 64 to adder 62 as described above. The absolute address produced by adder 62 is coupled to memory address register 24 to access the desired location in main memory 23.

If the values in the descriptor and field identification digit places of register 28 originally are both 0 as lead $P_2$ is energized, lead 56 becomes energized. This signifies that an original descriptor is stored in register 28 that references overlaid information. When lead 56 is energized, an interrupt signal is generated at the output of OR gate 57 that is coupled to processor 21, the peripheral memory address value stored in register 28 is coupled by lead 60 through an AND gate 81 and OR gate 73 to processor 21, and the length value stored in register 28 is coupled by lead 63 through an AND gate 80 and OR gate 79 to to processor 21. Consequently, the execution of the program is interrupted and the information stored at the designated peripheral memory address is returned to computer memory 20. At the end of the return operation, a lead 94 is energized. Lead 94 and OR gate 98 couple processor 21 to the field identification digit place in register 28 to change the value in this digit place to 1. The base address value of the array in main memory 23 where the returned information is stored is coupled from processor 21 to field 13 of the original descriptor in register 28 by a lead 96 and OR gate 97. Then a reinstate signal is generated, which is coupled by a lead 93 from processor 21 to sequence control circuit 42, thereby repeating the operation in which lead $P_2$ is energized. When lead $P_2$ is energized this time, lead 50 is energized because the value of the field identification digit place in register 28 is 1. Thus, the operation is initiated in which lead $P_3$ is energized.

If the values in the descriptor and field identification digit places of register 28 originally are 0 and 1, respectively, the operation in which lead $P_3$ is energized is initiated through AND gate 49 and lead 50 directly upon the first energization of lead $P_2$. In either case, where the descriptor identification digit place is 0, an index value is substituted for the length value in the original descriptor prior to the energization of lead $P_3$, in accordance with the procedure outlined in U.S. Pat. application Ser. No. 670,031.

The described operation of the address manipulation circuitry assumes that each copy descriptor in register 28 contains an index value as opposed to a length value. By utilizing the circuitry described in application Ser. No. 670,031, it is possible to accommodate copy descriptors in register 28 that contain either a length or index value. Each original and copy descriptor would have an additional identification digit place that indicates by its value whether the descriptor contains a length value or an index value. The operations described in the U.S. Pat. application Ser. No. 670,031 would be carried out responsive to the energization of lead 50 and prior to the energization of lead $P_3$, so that an index value would appear in the descriptor before the two fields in register 28 are added in adder 62. Thus, when an original descriptor referencing overlaid information occupies register 28 originally, the length value is available to locate the overlaid information in peripheral memory 34 before the index value replaces the length value.

Instead of employing the address of the cell at the lower boundary of an array as the base address value, the address of the cell at the upper boundary of the array could be employed. In other words, the addition of the base address and index values is considered in this specification in the algebraic sense, rather than the arithmetic sense.

Reference is now made to FIG. 2 which discloses part of the circuitry of FIG. 1 in connection with other circuitry that updates the descriptors on overlay of the information to peripheral memory 34. When it is desired to return information to computer memory 20 as described in connection with FIG. 1 and a lack of sufficient area is available in computer memory 20, an overlay instruction is coupled from processor 21 to instruction register 40. As a result, a start signal is generated. This start signal is coupled by a lead 95 to a sequence control circuit 83, thereby initiating a sequence of operations that updates the descriptors in stack memory 22.

First, lead $P_0$ is energized. The 1 output of flip-flop 29 and lead $P_0$ are connected to the inputs of an AND gate 84, the output of which is coupled through an OR gate 85 to the write input of read-write control circuit 32 and to stack address register 26. Thus, if register 27 is occupied as lead $P_0$ is energized, the descriptor stored in it is returned to the top of stack memory 22, flip-flop 29 is reset to indicate register 27 is not occupied, and the value stored in register 26 is increased by one.

Next, lead $P_1$ is energized. The 1 output of flip-flip 30 and lead $P_1$ are connected to the inputs of an AND gate 86, whose output is coupled through OR gate 85 to the write input of read-write control circuit 32 and to stack address register 26. Register 28 is coupled through an AND gate 87 to register 27. Accordingly, if register 28 is occupied as lead $P_1$ is energized, the descriptor stored in it is coupled through AND gate 87 to register 27 and then transferred to the top of stack memory 22. Flip-flop 30 is also reset to signify that register 28 is not occupied and the value stored in register 26 is increased by one.

Next, lead $P_2$ is energized. Processor 21 determines which information is to be overlaid in order to make room in main memory 23. The address in stack memory 22 of the original descriptor referencing the information to be overlaid is coupled through an AND gate 88 to an address register 89 and a stack search register 90. A count-up circuit 91 increases the value stored in register 90 by one each time it is actuated.

Next, lead $P_3$ is energized. Lead $P_3$ and the output of register 89 are connected to the inputs of an AND gate 92, lead $P_3$ and register 27 are connected to the inputs of an AND gate 100, and lead $P_3$ is connected to the read input of read-write control circuit 31. As lead $P_3$ is energized, the address value stored in register 89 is coupled through AND gate 92 to memory address register 24 and the item stored at this address in stack memory 22 is coupled first to register 27 and then through AND gate 100 to register 28. The original descriptor referencing the information to be overlaid remains in register 28 through the descriptor updating operation. As leads $P_4$, $P_5$, $P_6$, $P_7$, and $P_8$ are energized in succession, each item in the stack lying above this original descriptor is transferred to register 27 where its base address value is compared with the base address value of the original descriptor. If other types of items than descriptors are in the stack, then the comparison would also be made as to the digit places of the item identifying the type of item. When two descriptors have the same base value, the base value of the descriptor in register 27 is replaced by the original descriptor address, i.e., the location of the original descriptor in stack memory 22 and the value in the field identification digit place is modified accordingly.

Next, lead $P_4$ is energized to actuate count-up circuit 91. Thus, the address value stored in register 90 becomes the location in stack memory 22 of the item above the original descriptor.

Next, lead $P_5$ is energized. Lead $P_5$ and the output of register 90 are connected to the inputs of an AND gate 101, and lead $P_5$ is connected to the read input of read-write control circuit 31. The address value stored in register 90 is coupled through AND gate 101 to memory address register 24 and then the item at the designated location of stack memory 22 is transferred to register 27.

Next, lead $P_6$ is energized. Lead $P_6$ and the digit places of register 27 where the base address value is stored are coupled to the inputs of an AND gate 102. Lead $P_6$ and the digit places of register 28 where the base address value is stored are coupled to the inputs of AND gate 103. The outputs of AND gates 102 and 103 are compared in a comparator 104 whose output becomes energized when the two base address values are identical.

Next, lead $P_7$ is energized. Address register 89, the output of comparator 104, and lead $P_7$ are connected to the inputs of an AND gate 105 whose output is coupled to the digit places in register 27 where the base address value is stored. The output of comparator 104 and lead $P_7$ are also connected to the inputs of an AND gate 106 whose output is coupled to the field identification digit place in register 27. If the output of comparator 104 is energized as lead $P_7$ is energized, indicating identical base address values in register 27 and 28, the original descriptor address is substituted for the base address in register 27 and the value in the field identification digit place of register 27 is changed to 0. If comparator 104 indicates a lack of identity of a base address value, no change in the descriptor stored in register 27 takes place as lead $P_7$ is energized.

After lead $P_7$, $P_8$ is energized. Lead $P_8$ is connected to one input of AND gate 101 and to the write input of read-write control circuit 31. Therefore, the updated descriptor in register 27 is returned to the same location in the stack that it originally occupied when lead $P_8$ is energized. The outputs of stack address register 26 and stack search register 90 are connected to the inputs of a comparator 107. When the values in registers 26 and 90 are equal, the output of comparator 107 is energized. Comparator 107 is directly connected to an AND gate 108 and connected through an inverter 109 to an AND gate 110. The output of AND gate 108 is connected to sequence control circuit 83 so as to initiate upon its energization the sequence of operations in which leads $P'_4$, $P'_5$, and $P'_6$ are energized in succession. The output of AND gate 110 is connected to sequence control circuit 83 so as to initiate upon its energization a repeat of the sequence of operations in which leads $P_4$, $P_5$, $P_6$, $P_7$, and $P_8$ are energized. Assuming that the value in register 90 is less than the value in register 26, indicating that the search has not yet reached the top of stack memory 22, the output of AND gate 110 is energized as lead $P_8$ is energized. Thus, leads $P_4$ through $P_8$ are again energized in succession, the next higher item in the stack is compared with the original descriptor in register 28, and the value in register 90 is increased by one.

The sequence of operations in which leads $P_4$ through $P_8$ are energized is repeated until comparator 107 detects identical values in registers 90 and 26, indicating that the top of the stack has been reached. At this time, the output of AND gate 108 is energized as lead $P_8$ is energized. Therefore lead $P'_4$ is energized next. Lead $P'_4$ is connected to processor 21 to indicate that the stack search for descriptors referencing the overlaid information is completed.

Next, lead $P'_5$ is energized and the peripheral memory address, where the overlaid information is stored, is coupled through an AND gate 112 to the digit places in register 28 where the base address value is stored. Thus, the peripheral memory address is substituted for the base address of the original descriptor in register 28.

Next, lead $P'_6$ is energized. Lead $P'_6$ is connected to one input of AND gate 92 and to the write input of read-write control circuit 31. Register 28 and lead $P'_6$ are also connected to the inputs of AND gate 87 whose output is connected to register 27. As lead $P'_6$ is energized, the original descriptor address in register 89 is coupled through AND gate 92 to memory address register 24 and the original descriptor in register 28 is transferred through register 27 to the location in stack memory 22 indicated by the original descriptor address. At this point, the descriptor updating operation is completed. The information itself is overlaid to peripheral memory 34 by any one of a number of well-known techniques which are not the subject of this invention.

Figure 6:
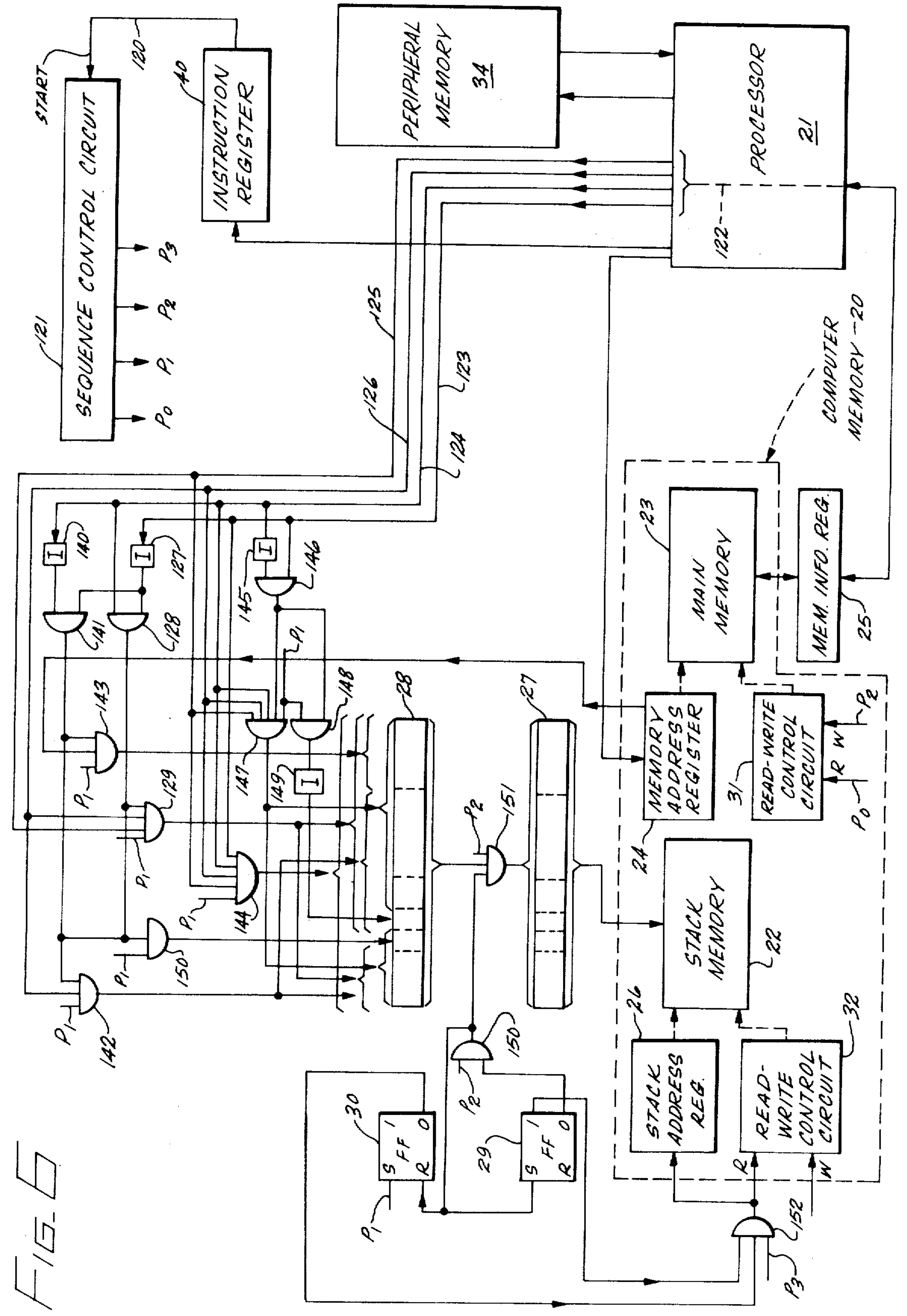
FIG. 6 is a block schematic diagram of circuitry for automatically generating descriptors according to the invention.

Reference is now made to FIG. 6, which discloses part of the circuitry of FIG. 1 in connection with other circuitry that automatically generates copy descriptors in the course of the operation of the computer. When it is desired to generate a copy of a descriptor, an appropriate copy instruction is coupled from processor 21 to instruction register 40, and the stack location of the descriptor to be copied is coupled from processor 21 to memory address register 24. Responsive to the receipt of the copy instruction, instruction register 40 generates a start signal that is coupled by a lead 120 to a sequence control circuit 121. Consequently, there is initiated a sequence of operations that leads to the generation of the desired copy and places it in the top position of stack memory 22.

First, lead $P_0$ of sequence control circuit 121 is energized. Lead $P_0$ is coupled directly to the read input of read-write control circuit 31. Thus, the item of information stored in main memory 23 at the address stored in register 24, which is the descriptor to be copied, is coupled through memory information register 25 to processor 21. The descriptor to be copied is coupled through processor 21, as indicated by dashed line 122, and segmented into its individual fields for transmission by leads 123, 124, 125 and 126. Lead 123 carries the descriptor identification digit (field 11 or 16); lead 124 carries field identification digit (field 10 or 15); lead 125 carries the field designating the base address or original descriptor location (field 8 or 13); and lead 126 carries the remaining portion of the descriptor to be copied.

Next, lead $P_1$ is energized. Lead 123 is coupled through an inverter 127 to one input of an AND gate 128, and lead 124 is coupled directly to the other input of AND gate 128. The output of AND gate 128, lead $P_1$, lead 125, and lead 126 are coupled to the respective inputs of an AND gate 129 whose output is coupled to all the digit places of register 28, except for the digit place where field 11 is to be stored. Lead 124 is coupled through an inverter 140 to one input of an AND gate 141, and the output of inverter 127 is coupled to the other input of AND gate 141. Lead $P_1$, lead 126, and the output of AND gate 141 are coupled to the respective inputs of an AND gate 142 whose output is connected to all the digit places of register 28, except for the digit places where fields 11 and 8 of the copy descriptor are to be stored. Lead $P_1$, the output of AND gate 141, and memory address register 24 are coupled to the respective inputs of an AND gate 143 whose output is connected to the digit places of register 28 where field 8 of the copy descriptor is to be stored. The outputs of AND gates 128 and 141 are connected through an AND gate 150 to the digit place of register 28 when field 11 is to be stored. Lead $P_1$ is connected to the other input of AND gate 150. Leads $P_1$, 123, 124, 125 and 126 are coupled to the respective inputs of an AND gate 144 whose output is connected to all the digit places of register 28. Lead 124 is coupled through an inverter 145 to an input of an AND gate 146, and lead 123 is directly coupled to the other input of AND gate 146. Lead $P_1$, the output of AND gate 146, lead 123, lead 125, and lead 126 are coupled to the respective inputs of an AND gate 147 whose output is connected to all the digit places of register 28, except for the digit place where field 10 is to be stored. Lead $P_1$ is directly connected to one input of an AND gate 148, and the output of AND gate 146 is connected to the other input of AND gate 148. The output of AND gate 148 is connected through an inverter 149 to the digit place of register 28 where field 10 is to be stored to store a 0 value therein when the output of AND gate 146 is energized.

If the descriptor to be copied has a 1 value in the descriptor identification digit place, the descriptor to be copied is itself a copy descriptor identical to copy descriptor 7 in FIG. 3 or FIG. 4. In such case, irrespective of the value in the field identification digit place, the descriptor to be copied is coupled from processor 21 to register 28 without change. If the descriptor to be copied has a 0 value in the field identification digit place, the descriptor to be copied is coupled from processor 21 through AND gates 147 and 148 to register 28. If the descriptor to be copied has a 1 value in the field identification digit place, the descriptor to be copied is coupled from processor 21 through AND gate 144 to register 28.

If the descriptor to be copied has a 0 value in the descriptor identification digit place and a 0 value in the field identification digit place, the descriptor to becopied is an original descriptor referencing information that is absent, i.e., overlaid in peripheral memory 34, as represented by original descriptor 12 in FIG. 5. In this case, AND gate 141 is energized and the original descriptor location stored in register 24 is coupled through AND gate 143 to the digit places of register 28 where field 8 is to be stored. The digit place of register 28 where the descriptor identification digit is stored is changed to contain a 0 value responsive to AND gate 141. The digits in the other digit places of the descriptor to be copied are coupled through AND gate 142 to the remaining digit places of register 28. Consequently, there is generated a copy descriptor identical in every respect to its original descriptor except for the original descriptor location in field 8 and the descriptor identification digit in field 11.

If the descriptor to be copied has a 0 value in the descriptor identification digit place and a 1 value in the field identification digit place, the descriptor to be copied is an original descriptor referencing information present in computer memory 20. In this case, AND gate 128 is energized. The digit place in register 28 where the descriptor identification digit is stored is changed to a 1 value, and the remaining digits of the descriptor to be copied are coupled through AND gate 129 to the other digit places of register 28. In short, there is generated in register 28 a copy descriptor that is identical to the descriptor to be copied except for the value of the descriptor identification digit in field 11. Flip-flop 30 is also set responsive to the energization of lead $P_1$ to indicate that register 28 is occupied.

After the copy descriptor is generated in register 28 responsive to the energization of lead $P_1$, lead $P_2$ is energized. Lead $P_2$ and the 0 output of flip-flop 29 are coupled to the respective inputs of an AND gate 150. The output AND gate 150 is connected to the S input of flip-flop 29 and the R input of flip-flop 30. The output of AND gate 150 is also coupled to one input of an AND gate 151. Lead $P_2$ and register 28 are coupled to the other inputs of AND gate 151. The output of AND gate 151 is coupled to register 27. Thus, when lead $P_2$ is energized, the copy descriptor stored in register 28 is transferred to register 27 if register 27 is unoccupied. In such case, flip-flop 29 is set to indicate that register 27 is occupied and flip-flop 30 is reset to indicate that register 28 is unoccupied. If register 27 is occupied when lead $P_2$ is energized, nothing occurs, the newly generated copy descriptor remaining in register 28.

Next, lead $P_3$ is energized. Lead $P_3$, the 0 output of flip-flop 30, and the 1 output of flip-flop 29 are connected to the respective inputs of an AND gate 152. The output of AND gate 152 is coupled to stack address register 26 to increase its address value by one and to the read input of read-write control circuit 32. Consequently, if register 28 is unoccupied and register 27 is occupied, which condition would only exist if the newly generated copy descriptor had previously been transferred from register 28 to register 27 responsive to the energization of lead $P_2$, the newly generated copy descriptor is transferred from register 27 to the top of stack memory 22. Otherwise, nothing occurs responsive to the energization of lead $P_3$.

In copying an original descriptor it is a simple matter to substitute an index value for a length value in field 9. Substitution would simply be made responsive to the instruction as the descriptor to be copied is being coupled through processor 21 from memory information register 25 to leads 123, 124, 125 and 126. Some particular types of copy instructions would perform the indexing operation and others would leave the length value intact.

What is claimed is:

1. Address manipulation circuitry for a digital computer comprising:
   an addressable computer memory;
   a peripheral memory;
   a source of copy descriptors and original descriptors referencing information stored in groups of memory cells forming arrays in the computer memory,
   each original descriptor including a first field designating either the base address value of an array in the computer memory or an address value in the peripheral memory where the information of the array is stored, a second field designating the length value of the array, and a third field designating the nature of the first field,
   each copy descriptor including a first field designating either the base address value of an array or the location of the original descriptor of the array in the source, a second field designating the index value of a cell in the array from the base address value, and a third field designating the nature of the first field;
   means responsive to the occurrence of an instruction to access a cell of the computer memory for inspecting the designation of the third field of an appropriate copy descriptor;
   means responsive to the designation by the third field of a base address value in the first field for adding the first and second fields to produce an absolute address; and
   means for applying to the computer memory the absolute address produced by the adding means to access the memory cell designated by the absolute address.

2. The circuitry of claim 1, additionally comprising means responsive to the designation by the third field of an original descriptor location in the first field for retrieving the original descriptor and adding the first field of the original descriptor and the second field of the copy descriptor to produce an absolute address.

3. The circuitry of claim 1, additionally comprising:
   means responsive to the designation by the third field of an original descriptor location in the first field for retrieving the original descriptor;
   means for inspecting the designation of the third field of the retrieved original descriptor; and
   means responsive to the designation by the third field of the retrieved original descriptor of a base address value in the first field for adding the first field of the original descriptor and the second field of the copy descriptor to produce an absolute address.

4. The circuitry of claim 3, additionally comprising means responsive to the designation by the third field of the retrieved original descriptor of a peripheral memory address value for interrupting the execution of the computer program in progress.

5. The circuitry of claim 4, additionally comprising:
   means upon the interruption of the computer program for returning the information at the address in the peripheral memory to an array in the computer memory;
   means for inserting the base address value of the array to which the information is returned in the first field of the original descriptor; and
   means for modifying the third field of the original descriptor to designate a base address value in the first field.

6. The circuitry of claim 5, additionally comprising:
   means responsive to an overlay command including the base address value of the array in the computer memory where the information to be overlaid is stored for comparing the first field of the copy descriptors in the source with said base address value, inserting into the first field of copy descriptors having said base address value in the first field the location in the source of the original descriptor referencing the information to be overlaid, modifying the third field of said copy descriptors to designate an original descriptor location in the first field, inserting the peripheral memory address of the overlaid information into the first field of the original descriptor referencing said information, and modifying the third field of said original descriptor to designate a peripheral memory address value in the first field.

7. The circuitry of claim 1, additionally comprising:

means responsive to the designation by the third field of an original descriptor location in the first field for retrieving the original descriptor;

means for inserting the base address value in the first field of the original descriptor into the first field of the inspected copy descriptor and modifying the third field of said copy descriptor to designate a base address value in the first field; and means for repeating the inspection of the designation of the third field of said copy descriptor to effect addition of the first and second fields of said copy descriptor to produce an absolute address.

8. The circuitry of claim 1, additionally comprising:

means responsive to an overlay instruction including the base address value of the array in the computer memory where the information to be overlaid is stored for comparing the first field of the copy descriptors in the source with the base address value, inserting into the first field of copy descriptors having said base address value in the first field the location in the source of the original descriptor referencing the information to be overlaid, and modifying the third field of said copy descriptors to designate an original descriptor location in the first field.

9. The circuitry of claim 8, additionally comprising means for inserting the peripheral memory address value of the overlaid information into the first field of the original descriptor referencing the information and means for modifying the third field to designate a peripheral memory address value in the first field.

10. The circuitry of claim 1, additionally comprising:

means responsive to the occurrence of an instruction to copy a descriptor for copying such descriptor without change if it is itself a copy descriptor; and means for placing the new copy descriptor in the source.

11. The circuitry of claim 10, in which the means responsive to an instruction to copy a descriptor for copying such descriptor substitutes the location of the original descriptor in the source into the first field if the descriptor to be copied is an original descriptor having a third field that designates a peripheral memory address value in the first field.

12. The circuitry of claim 11, in which each descriptor also includes a fourth field designating the nature of the descriptor and the means responsive to an instruction to copy a descriptor for copying an original descriptor changes the fourth field to designate a copy descriptor.

13. Address manipulation circuitry for a digital computer comprising:

an addressable computer memory;

a peripheral memory;

a source of copy descriptors and original descriptors referencing information stored in groups of memory cells forming arrays in the computer memory, each original descriptor including a first field designating either the base address value of an array in the computer memory or an address value in the peripheral memory, a second field designating the length value of the array, a third field designating the nature of the first field, and a fourth field designating the nature of the descriptor, each copy descriptor including a first field designating either the base address value of an array in the computer memory or the location of an original descriptor of the array in the source, a second field designating the index value of the cell in the array from the base address value, a third field designating the nature of the first field, and a fourth field designating the nature of the descriptor;

a register for temporarily storing a selected one of the descriptors of the source;

means responsive to the occurrence of an instruction to access a cell of the computer memory for inspecting the designation of the third and fourth fields of the descriptor stored in the register;

means responsive to the designation by the third field of a base address value in the first field for adding the first and second fields to produce an absolute address; and means for applying to the computer memory the absolute address produced by the adding means to access the memory cell designated by the absolute address.

14. The circuitry of claim 13, additionally comprising:

means responsive to the designation by the third field of an original descriptor location in the first field and to the designation by the fourth field of a copy descriptor for retrieving the original descriptor;

means for inspecting the designation of the third field of the retrieved original descriptor; and means responsive to the designation by the third field of the retrieved original descriptor of a base address value in the first field for adding the first field of the original descriptor and the second field of the copy descriptor to produce an absolute address.

15. The circuitry of claim 14, additionally comprising means responsive to the designation by the third field of the retrieved original descriptor of a peripheral memory address value in the first field for interrupting the execution of the computer program in process to return the information referenced by the original descriptor.

16. The circuitry of claim 13, additionally comprising means responsive to the designation by the third field of a peripheral memory address in the first field and the designation by the fourth field of an original descriptor for interrupting the execution of the computer program in progress to return the information referenced by the original descriptor.

17. The circuitry of claim 13, additionally comprising upon the occurrence of an instruction to copy a descriptor:

means responsive to the third and fourth fields of the descriptor to be copied for copying such descriptor without change if it is itself a copy descriptor; and means for placing the new copy descriptor in the source.

18. The circuitry of claim 17, in which the copying means substitutes the location of the original descriptor in the source into the first field, and changes the fourth field to designate a copy descriptor if the descriptor to be copied has a third field that designates a peripheral memory address value in the first field and a fourth field that designates an original descriptor.

19. Address manipulation circuitry for a digital computer comprising:

an addressable computer memory;

a peripheral memory;

a source of copy descriptors and original descriptors referencing information stored in groups of memory cells forming arrays in the computer memory, each copy descriptor including a first field designating either the base address value of an array or the location of an original descriptor of the array in the source, a second field designating the index value of a cell in the array from the base address value, and a third field designating the nature of the first field, each original descriptor including a first field designating either the base address value of an array in the computer memory or an address value in the peripheral memory where the information from the array is stored, a second field designating the length of the array, and a third field designating the nature of the first field; and means for updating the descriptors referencing information in an array upon overlay of said information comprising means for comparing the base address value of the array in the computer to be overlaid with the first field of the copy descriptors in the source, means for inserting into the first field of copy descriptors having said base address value in the first field the location in the source of the original descriptor of the information to be overlaid, and means for modifying the third field of said copy descriptors to designate an original descriptor location in the first field.

20. The circuitry of claim 19, additionally comprising means for inserting the peripheral memory address value of the overlaid information into the first field of the original descriptor referencing said information and means for modifying the third field of said original descriptor to designate a peripheral memory address value in the first field.

21. The circuitry of claim 20, in which means are provided for updating the descriptors referencing overlaid information upon the return of the overlaid information to an array in the computer memory comprising:

means for inserting the base address value of the array to which the information is returned in the first field of the original descriptor referencing said information; and means for modifying the third field of said original descriptor to designate a base address value in the first field.

22. Address manipulation circuitry for a digital computer comprising:

an addressable computer memory;

a peripheral memory;

a source of copy descriptors and original descriptors referencing information stored in groups of memory cells forming arrays in the computer memory, each original descriptor including a first field designating either a base address value of an array in the computer memory or an address value in the peripheral memory where the information from the array is stored, a second field designating the length of the array, and a third field designating the nature of the first field, each copy descriptor including a first field designating the location in the source of the original descriptor referencing the array and a second field designating the index value of a cell in the array from the base address value of the array; and means upon the return of overlaid information from the peripheral memory to an array of the computer memory for updating the descriptors referencing said information consisting of means for inserting into the first field of the original descriptor referencing said information the base address value of the array to which the information is returned; and means for modifying the third field of said original descriptor to designate a base address value in the first field.

23. In a computer having a memory, address manipulation means for the memory comprising:

a source of information signals including a copy descriptor and an original descriptor, the copy descriptor having a first field designating either a base address in the memory or the location of the original descriptor in the source and a second field designating an index value in the memory, the original descriptor having a field designating a base address in the memory;

means responsive to the first field of a copy descriptor when an original descriptor location is present for retrieving the information at the original descriptor location;

means for selectively replacing the original descriptor location in the first field of the copy descriptor with the base address from the retrieved information at the original descriptor location thereby forming a modified copy descriptor identifying a particular memory location; and means responsive to the first and second fields of the modified copy descriptor for addressing the memory for reading or writing.

24. In a computer having a memory, address manipulation means for the memory comprising:

first and second register means for storing a copy descriptor and an original descriptor, respectively, the copy descriptor having a first field designating a base address or the location of the original descriptor and a second field designating an index value, the original descriptor having a field designating a base address;

means for coupling a copy descriptor to the first register;

means for determining if the first field of the copy descriptor in the first register is a base address or an original descriptor location;

means responsive to the determining means for coupling to the second register the information at the original descriptor location designated by the first field of the copy descriptor in the first register if said first field is determined to be an original descriptor location;

means for selectively replacing the original descriptor location of the the copy descriptor in the first register with the base address of the information in the second register, thereby forming a modified copy descriptor identitying a particular location; and means responsive to the modified copy descriptor in the first register means for addressing the memory for reading or writing.

25. The computer of claim 24, in which the copy descriptor stored in the first register means also has a third field designating the nature of the first field and the replacing means operates responsive to the designation of an original descriptor location by the third field.

26. In a computer having a computer memory and a peripheral memory, address manipulation means for the computer memory comprising:

a source of information signals including copy descriptors and original descriptors, the copy descriptors having a first field designating either a base address or the location of its original descriptor in the computer memory and a second field designating an index value in the computer memory, the original descriptors having a field designating a base address in the computer memory or a peripheral memory address;

means responsive to a copy instruction for retrieving from a given location of the source of information signals a descriptor to be copied;

means for selectively replacing the peripheral memory address of the descriptor to be copied with information representative of the given location of the source when the descriptor to be copied is an original descriptor to form a copy descriptor of such original descriptor; and means for storing the formed copy descriptor in the source.

27. The address manipulation means of claim 26, in which means are provided for storing the descriptor to be copied in the source without change if such descriptor is itself a copy descriptor.

28. The address manipulation means of claim 27, in which each descriptor has a field identifying the nature of the descriptor and means are provided for selectively replacing the original descriptor designation in the descriptor identification field of an original descriptor with a copy descriptor designation prior to storing the descriptor in the source.

29. The address manipulation means of claim 26, in which each descriptor has a field identifying the nature of the descriptor and means are provided for selectively replacing the original descriptor designation in the descriptor identification field of an original descriptor with a copy descriptor designation prior to storing the descriptor in the source.

30. In a computer having a computer memory and a peripheral memory, address manipulation circuitry comprising:

a register for storing a copy descriptor, the register including a portion assigned to a first field designating a base address or the location of an original descriptor in a computer memory;

a source of descriptors to be copied, the source including copy descriptors having a first field designating a base address or the location of its original descriptor, a second field designating the nature of the first field, and a third field designating an index value, and original descriptors having a first field designating a base address or a peripheral memory address, a second field designating the nature of the first field, and a third field designating a length value;

means responsive to a copy instruction for retrieving from the source the descriptor to be copied;

means for selectively coupling portions of the descriptor to be copied to the register;

means responsive to the first field of the descriptor to be copied when a peripheral memory address is present for coupling the location of such descriptor in the computer memory to the portion of the register assigned to the first field; and means for coupling the contents of the register to the source as the copy descriptor.

31. The address manipulation means of claim 30, in which the register has a portion assigned to a second field identifying the nature of the descriptor and the second field is changed from a value designating an original descriptor to a value designating a copy descriptor prior to coupling the contents of the register to the source.

32. A method for developing an absolute address for accessing a cell in a computer memory of a digital computer that functions with a peripheral memory; the computer having a source of copy descriptors and original descriptors referencing information stored in groups of memory cells that form arrays in the computer memory; the original descriptors including a first field designating either the base address value of an array in the computer memory or an address value in the peripheral memory where the information of the array is stored, a second field designating the length value of the array, and a designation of the nature of the first field; the copy descriptors including a first field designating either the base address value of an array in the computer memory or the location of the original descriptor of the array in the source, a second field designating the index value of a cell in the array from the base address value, and a designation of the nature of the first field; the method comprising the steps of:

inspecting an appropriate copy descriptor to determine the nature of its first field;

adding the first and second fields of said copy descriptor to produce an absolute address if the first field of said copy descriptor is a base address value; and accessing the cell of the computer memory indicated by the absolute address.

33. The method of claim 32, additionally comprising the steps of:

retrieving from the source the original descriptor designated by the first field of said copy descriptor if said copy descriptor designates that its first field is an original descriptor location; and adding the first field of the retrieved original descriptor and the second field of said copy descriptor to produce an absolute address for accessing the computer memory.

34. The method of claim 32, additionally comprising the steps of:

retrieving from the source the original descriptor designated by the first field of said copy descriptor if said copy descriptor designates that its first field is an original descriptor location;

inspecting the retrieved original descriptor to determine the nature of its first field; and interrupting the execution of the computer program in progress if the first field of said retrieved original descriptor is a peripheral memory address value.

35. A method for updating address values of information processed by a digital computer that functions with a peripheral memory; the computer having an addressable computer memory and a source of copy descriptors and original descriptors referencing information stored in groups of memory cells that form arrays in the computer memory; the original descriptors including a first field designating either the base address value of an array in the computer memory or an address value in the peripheral memory where the information of the array is stored and a second field designating the length value of the array; the copy descriptors including a first field designating either the base address value of an array or the location of the original descriptor of the array in the source and a second field designating the index valve of a cell in the array from the base address value; the method comprising the steps of:

overlaying into the peripheral memory the information stored in an array in the computer memory;

comparing the base address value of the overlaid array in the computer memory with the first field of the copy descriptors in the source; and substituting into the first field of compared copy descriptors having the same base address value as the overlaid array the location in the source of the original descriptor of the overlaid array.

36. The method of claim 35, additionally comprising the step of substituting into the first field of the original descriptor of the overlaid array the address value of the overlaid array in the peripheral memory.

37. The method of claim 36, additionally comprising the steps of:

designating that the first field of said copy descriptors is an original descriptor location; and designating that the first field of said original descriptor is a peripheral memory address value.

38. A method of updating address values of information processed by a digital computer that functions with a peripheral memory, the computer having an addressable computer memory, the method comprising the steps of:

generating and storing copy descriptors and original descriptors referencing information stored in groups of memory cells forming arrays in the computer memory, the copy descriptors including a first field designating either the base address value of an array in the computer memory or the storage location of an original descriptor of the array in the source and a second field designating the index value of a cell in the array from the base address value, the original descriptors including a first field designating the base address value of an array in the computer memory or an address value in the peripheral memory where the information from the array is stored and a second field designating the length of the array;

returning overlaid information to an array of the computer memory from the peripheral memory; and substituting for the peripheral memory address value in the first field of the original descriptor referencing said information the base address value of the array to which the information is returned.

39. A method for producing copies of original descriptors referencing information stored in a computer memory of a digital computer that functions with a peripheral memory; the computer having a source of descriptors to be copied; the source including copy descriptors having a first field designating a base address or the location of its original descriptor in the source and a second field designating an index value and original descriptors having a first field designating a base address or a peripheral memory address and a second field designating the nature of the first field, the method comprising the steps of:

retrieving from the source the descriptor to be copied;

substituting for the peripheral memory address in the first field of the retrieved descriptor the location of such descriptor in the source when a peripheral memory address is present in the first field of said retrieved descriptor, thereby forming a copy descriptor; and placing the copy descriptor in the source.

* * * * *

PO-1050
(5/69)
6665

UNITED STATES PATENT OFFICE
CERTIFICATE OF CORRECTION

Patent No. 3,699,528 Dated October 17, 1972

Inventor(s) Carl B. Carlson, Wm. M. McKeeman, Wm. C. Price

It is certified that error appears in the above-identified patent and that said Letters Patent are hereby corrected as shown below:

Patent column 1, line 14, "compter" should be --computer--.

Patent column 7, line 7, "Sequence control 42" should be --Sequence control circuit 42--.

Patent column 11, line 41, "register 28 through the descriptor" should be --register 28 throughout the descriptor--.

Patent column 12, line 20, "register 27 and 28" should be --registers 27 and 28--.

Patent column 14, line 45, "becopied" should be --be copied--

Patent column 23, line 32, "index valve" should be --index value--.

Signed and sealed this 27th day of November 1973.

(SEAL)
Attest:

EDWARD M.FLETCHER,JR.
Attesting Officer

RENE D. TEGTMEYER
Acting Commissioner of Patents